United States Patent
He

(10) Patent No.: US 6,754,500 B1
(45) Date of Patent: Jun. 22, 2004

(54) CHANNEL GROUPING SYSTEM AND METHOD FOR A WIRELESS COMMUNICATION SYSTEM

(75) Inventor: Allen He, Cedar Knolls, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/571,501

(22) Filed: May 15, 2000

(51) Int. Cl.[7] .............................................. H04Q 7/20
(52) U.S. Cl. .................... 455/452.1; 455/450; 455/513; 455/161.3; 370/431
(58) Field of Search ................................. 455/434, 448, 455/450, 452.1, 464, 513, 506, 515, 517, 452.2, 101.3, 511, 509; 370/431

(56) References Cited

U.S. PATENT DOCUMENTS

| | | | | |
|---|---|---|---|---|
| 4,475,010 A | * | 10/1984 | Huensch et al. | ............ 370/334 |
| 5,613,200 A | * | 3/1997 | Hamabe | ...................... 455/450 |
| 5,666,654 A | * | 9/1997 | Kanai | ....................... 144/134.1 |
| 5,666,655 A | * | 9/1997 | Ishikawa et al. | ............ 455/512 |
| 5,887,263 A | * | 3/1999 | Ishii | .......................... 455/452.1 |
| 5,905,962 A | * | 5/1999 | Richardson | .................. 455/522 |
| 6,108,541 A | * | 8/2000 | Yazaki et al. | ............... 340/7.42 |
| 6,131,039 A | * | 10/2000 | McGuire | ..................... 455/522 |
| 6,138,024 A | * | 10/2000 | Evans et al. | ................ 455/448 |
| 6,173,162 B1 | * | 1/2001 | Dahlman et al. | ............. 455/69 |
| 6,185,423 B1 | * | 2/2001 | Brown et al. | ................ 455/434 |

* cited by examiner

*Primary Examiner*—William Trost
*Assistant Examiner*—Congvan Tran

(57) ABSTRACT

A channel grouping system and method for a wireless communication system in which channels are allocated to channel groups according to received signal strength (RSS) data of mobile station accessing occurrences. A group allocator allocates the channels to the channel groups according to RSS data obtained from signals transmitted by a plurality of mobile stations. The channel groups correspond to a series of RSS power level intervals, and the RSS values are associated with the power level intervals into which the RSS values fall. The group allocator generates a probability density function describing the expected number of mobile station accessing occurrences having an RSS value falling within each power level interval. The group allocator then allocates a number of channels to each channel group according to the PDF.

22 Claims, 3 Drawing Sheets

CHANNEL GROUPING SYSTEM AND METHOD FOR A WIRELESS COMMUNICATION SYSTEM

RELATED APPLICATION

This application is related to copending U.S. patent application Ser. No. 09/291,757, entitled "CHANNEL GROUPING SYSTEM AND METHOD FOR A WIRELESS COMMUNICATION SYSTEM," filed Apr. 14, 1999 by Allen He, a copy of that originally-filed application being attached hereto as the Appendix, the entirety of that application hereby being incorporated by reference.

FIELD OF THE INVENTION

This invention relates to a channel grouping system and method for a wireless communications system.

BACKGROUND

In a wireless communications system, an uplink channel between a mobile station and a base station has a received signal strength (RSS) value that depends upon the location of the mobile station relative to the base station. RSS values are associated with electromagnetic transmissions transmitted by mobile stations distributed throughout a coverage area (or "cell). In a time-division multiple access (TDMA) communications system, multiple uplink channels may be used simultaneously.

The dynamic range of a cell represents a range from a lowest received signal strength of one channel to a highest received signal strength of another channel, where the channels are received simultaneously. For example, a lowest received signal strength can result from a mobile station located at a periphery of the cell served by a base station centrally located in the cell. A wide dispersion of mobile stations throughout a coverage area results in a wide dynamic range.

In a TDMA wireless system, a wide dynamic range creates stringent isolation requirements in base station receiver circuitry. For example, a receiver may group channels from different frequency groups for input into a common intermediate frequency (IF) circuit module. The common IF circuit module requires a degree of isolation that generally increases as the dynamic range of received signal strengths within a cell increases. Radio frequency (RF) shielding can isolate the module circuitry to prevent a "loud" channel with a higher signal magnitude from interfering with a "quiet" channel of lower signal magnitude. However, while RF shielding may provide adequate RF isolation between circuit components, RF shielding decreases maximum achievable circuit board density and increases cost.

In addition to increasing isolation requirements, a wide dynamic range may impede the ability of the base station to adjust the downlink transmit power transmitted to mobile stations. If downlink power control is required, slot-by-slot power control can be utilized. However, slot-by-slot power control is difficult to perform.

One solution to the above problems, described in the related copending U.S. patent application (mentioned above), is to group the channels allocated to a cell into channel groups in which each channel group includes channel members having similar RSS values. The isolation requirement is reduced when the RF channels, being in differing frequency bands and mapped into the same IF channel, have similar received power levels. A receiver can then assign the grouped channels for input into a common IF module with a lower probability of a loud channel interfering with a quiet channel. Downlink power control is also facilitated in that downlink transmit power can be adjusted according to the RSS values in each channel group.

When allocating channels having similar RSS values into channel groups, it is difficult to ensure equal "blocking rates," a measure of quality of service, across all groups of RF channels. A blocking rate represents a probability that one or more mobile stations requesting access to the communications system will be denied access because of insufficient traffic capacity in the wireless communications system—i.e., the likelihood that access will be "blocked" due to hardware limitations in the base station. A typical target blocking rate is 2%.

Base station hardware (e.g., IF modules) is allocated to channel groups in proportion to the number of channels assigned to each group. Therefore, if the number of channels in a particular group is too low to handle the mobile stations accessing that group, accessing occurrences may be blocked. If the number of channels in a group is too high (exceeds demand), another channel group may experience blocked calls because of the poor allocation of resources.

Therefore, a difficulty in creating channel groups having channels with similar RSS values lies in allocating channels to the channel groups so that the target blocking rate is maintained across all channel groups. A uniform blocking rate is desirable because it indicates that all mobile station users in the cell have an equal probability of placing a successful call.

The related copending application solves the problem of channel allocation by generating a cumulative density function of the RSS values from mobile stations in a cell. Channel groups are then created having a uniform number of channels across all groups, with the channel groups being associated with power ranges of differing size. This method, however, may not be suitable for all wireless systems. The present invention presents an alternative solution to the problems associated with the conventional art.

SUMMARY OF THE INVENTION

Therefore, the invention, in part, lies in the recognition that a need exists for a method of allocating RF channels having similar power levels to channel groups within a cell, with a uniform target blocking rate maintained across all channel groups in the cell. The invention also addresses the need for a channel grouping system capable of allocating channels having similar RSS values to a channel group, and maintaining a uniform target blocking rate for all channel groups.

According to an aspect of the invention, channels are allocated to channel groups that are associated with a series of power level intervals. The number of channels in a channel group is dependent upon the number of received signal strength (RSS) values falling within the power level interval associated with that group. Therefore, the number of channels in each channel group will typically not be constant for all channel groups.

According to the invention, a group allocator in a wireless communication system allocates channels to channel groups according to RSS data measured at a measurement location (for example, at a base station) within an RF coverage area (e.g., a cell). The RSS data are obtained from signals transmitted by a plurality of mobile stations distributed throughout the cell.

During a sampling period, received signal strengths of signals transmitted by mobile stations accessing the wireless communication system are measured and classified according to RSS. The RSS values are maintained in an RSS database in the group allocator. Using the RSS data, a histogram is generated in which the number of mobile station accessing occurrences at a base station is plotted versus the RSS value at which they access the base station.

The channel groups correspond to a series of RSS power level intervals. The RSS values from the histogram are associated with the power level intervals (and the respective channel groups) into which the RSS values fall. Once the RSS values are associated with their respective channel groups, the population of each channel group (i.e., the number of RSS values falling within a channel group's power level interval) is determined. The population of each channel group is then divided by the total number of mobile station accessing occurrences, which yields a probability density function (PDF) value for each channel group.

A base station is typically allotted a specified number of channels. According to the present invention, the PDF value for each channel group is multiplied by the number of channels available to a base station. After rounding and adjusting the product values from the multiplication step, the group allocator allocates a number of channels to each channel group according to the rounded and adjusted product value for each channel group. A channel assignment device assigns mobile stations accessing the wireless system to channel groups based upon the RSS of the signals received from the mobile stations.

The method and system of the present invention provides for dynamic, real-time adjustment of the number of channel groups and the number of channels allocated to each group. Because base stations typically measure RSS continuously, RSS data is available to update the RSS database. Therefore, the channel allocator can periodically reconfigure the channel groups to reflect a change in mobile accessing activity within the cell, and according to other factors affecting the quality of service within the cell.

When channels are allocated to channel groups according to the above method and system, isolation requirements in base station circuitry are reduced while maintaining an essentially uniform blocking rate for all mobile stations in the cell. By allocating a number of channels to each group that is proportional to the accessing probability of the channel group, channel groups with higher accessing probabilities are provided greater capacity with which to accommodate a greater number of accessing occurrences. This method increases the capacity of the wireless communication system, and reduces unsuccessful accessing attempts by mobile stations. In addition, downlink power control is facilitated, in that the base station can adjust downlink power according to the RSS values in each channel group.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING FIGURES

The present invention will become more fully understood from the detailed description given hereinbelow and the accompanying drawings which are given by way of illustration only, and thus are not limitative of the present invention, and wherein.

DETAILED DESCRIPTION

In the context of a TDMA system, "channel" refers to a frequency channel, a time-slot channel, or a time-slot within a frequency channel. Although the channel grouping system and method may be applied to any type of channel, the channel grouping system and method according to the present invention are particularly well-suited for grouping frequency channels in a TDMA wireless communications system.

Method for Grouping Channels

Figure 1:
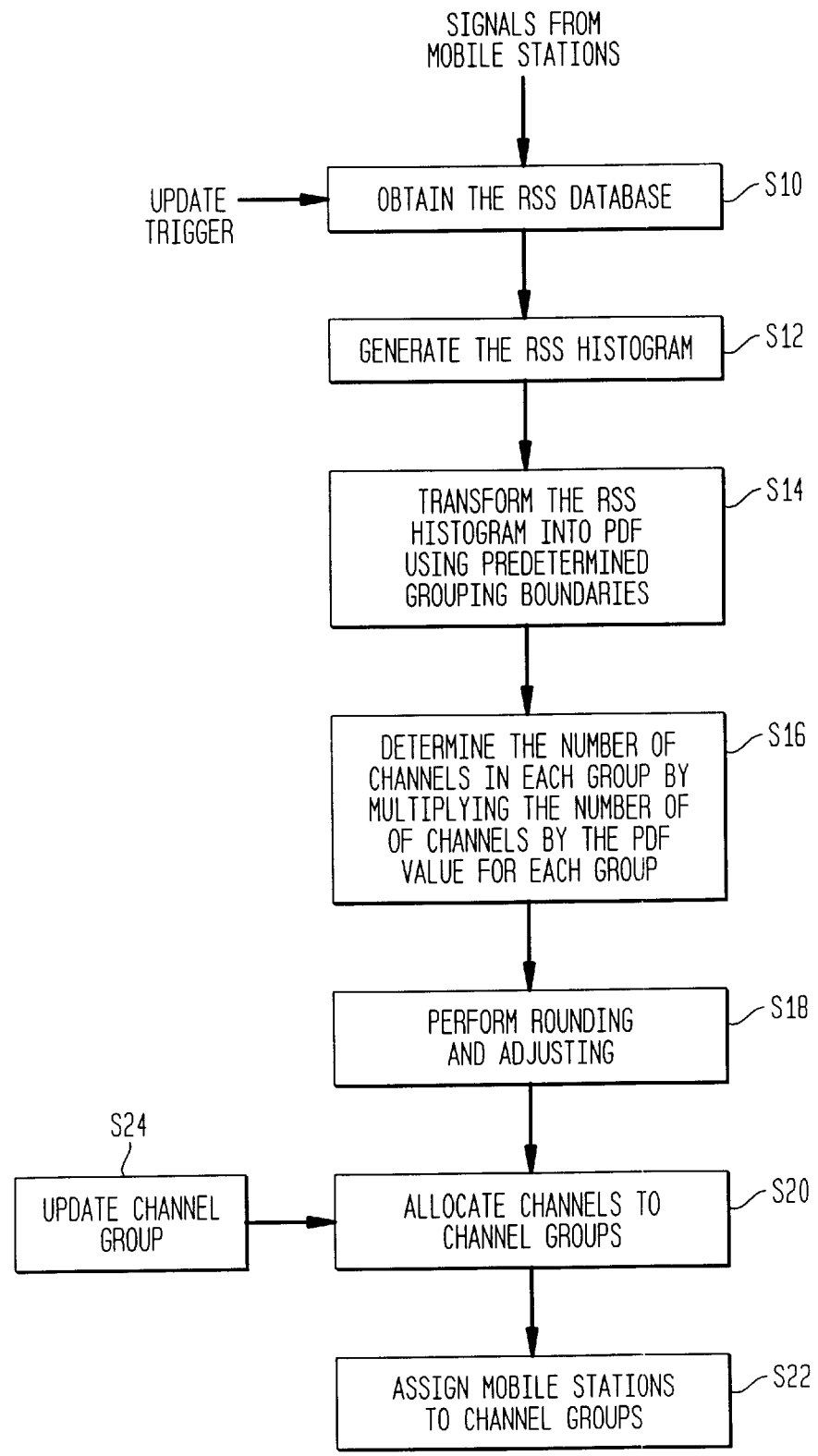
FIG. 1 is a flow chart illustrating a method of channel grouping in accordance with the present invention.

FIG. 1 illustrates a method of grouping channels in accordance with the present invention. Starting at step S10, an RSS measurement device measures received signal strengths at a measurement location. The measurement location may be a base station centrally located within the RF coverage area (e.g., the "cell"). The RSS measurement device may, for example, include a received signal strength indicator integrated into a commercially available base station. The RSS measurement device is coupled to a measurement recorder for recording the measured signal strengths and for organizing the RSS data into a database.

The measuring procedure of step S10 may include collecting a sufficient number of measurement samples to establish an RSS database, mobile station identifiers corresponding to the RSS values, and time-stamps corresponding to RSS values. A time-stamp would indicate the time of transmission of a mobile station. Each RSS value results from a measurement sample measured over a measuring duration of sufficient length to provide a reliable indication of the RSS. A number of measurement samples for a cell must be taken over a sufficient sampling period to produce a statistically reliable indication of the actual distribution of active mobile stations in the cell.

An adequate sampling period equals or exceeds the time required to gather a minimum number of measurement samples in order to attain a desired degree of statistical confidence. In practice, a sampling period typically represents a fixed time interval in the range of 10 minutes to several hours. A statistically reliable indication generally requires at least 100 measurement samples per cell, with statistical confidence increasing with the number of samples. The estimated traffic pattern within each cell of a wireless system should become relatively stabile once the minimum number of measurement samples is measured.

Figure 2:
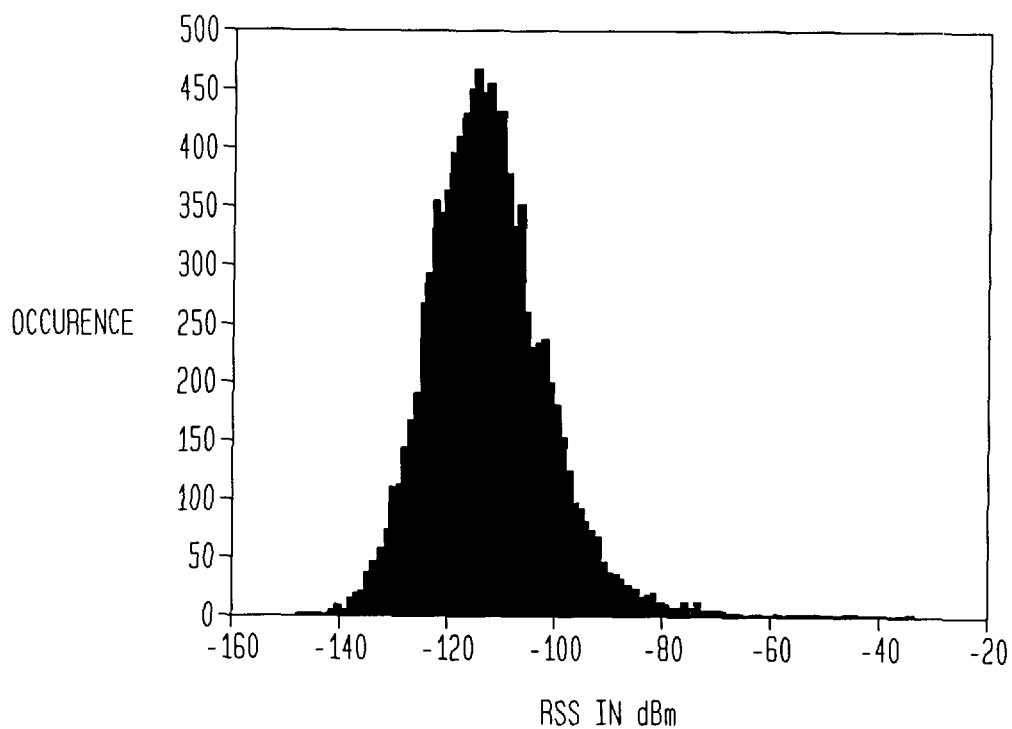
FIG. 2 is an exemplary histogram of mobile station accessing occurrences versus received signal strength.

In step S12, the measured RSS data of step S10 are provided to a group allocator. The group allocator may comprise, for example, a general purpose computer, or a processing section integrated into infrastructure of the wireless system, such as the infrastructure of a base station servicing a cell. In step S12, the group allocator arranges the RSS data into an RSS histogram of mobile station accessing occurrences versus the received signal strengths of the occurrences. FIG. 2 illustrates an exemplary distribution of mobile station accessing occurrences plotted according to their RSS. In FIG. 2, RSS indicates a received power level at a base station, and is measured in dBm. As shown in FIG. 2, the number of mobile station accessing occurrences is typically nonuniform across the range of power levels.

In step S14, the group allocator transforms the RSS histogram into a probability density function (PDF) of the RSS data. The probability density function expresses the probability that a mobile station will present a particular RSS value to the RSS measurement device. In order to generate the PDF of the RSS data, the group allocator first associates the measured RSS values with a power level interval (each power level corresponding to one of a plurality of channel groups), according to the power level interval into which the RSS falls. Table 1 illustrates an exemplary number of power level intervals and exemplary power level boundaries for each power level interval:

TABLE 1

Channel Groups Associated with their Respective Power Level Intervals

| Ch. Group | 1 | 2 | 3 | 4 | 5 | 6 |
|---|---|---|---|---|---|---|
| interval (dBm) | (−∞, −130] | (−130, −120] | (−120, −110] | (−110, −100] | (−100, −90] | (−90, ∞) |

The channel groups include a first channel group associated with a power level interval, a second channel group associated with a second power level interval distinct from the first power level interval, a third power level interval, etc. The "(" and ")" parentheses symbols indicate that the value adjacent the parentheses is not included in the power level interval, and the "[" and "]" bracket symbols indicate that the value adjacent the bracket is included in the power level interval. The first power level interval and the second power level interval may be adjacent to one another and preferably represent mutually exclusive spans of power levels. Subsequent power level intervals may be similarly mutually exclusive. Further, the power level intervals are not restricted to covering equivalent span sizes or uniform intervals of power levels, or adjacent intervals. The power level intervals of the end channel groups (here, channel groups 1 and 6) may be limited to a finite range similar to the inner power levels.

Once the number of mobile station accessing occurrences associated with each power level interval.(i.e., the channel group population) is determined, the channel group population values are then divided by the total number of mobile station accessing occurrences in all channel groups. This division yields a probability density function (PDF) expressing the likelihood that a mobile station will access the wireless system at an RSS falling within a particular power level interval. Table 2 illustrates exemplary PDF values for a cell having six channel groups:

TABLE 2

Channel Group PDF Values

| Ch. Group | 1 | 2 | 3 | 4 | 5 | 6 |
|---|---|---|---|---|---|---|
| PDF | 0.0369 | 0.2092 | 0.38 | 0.253 | 0.0893 | 0.0316 |

Figure 3:
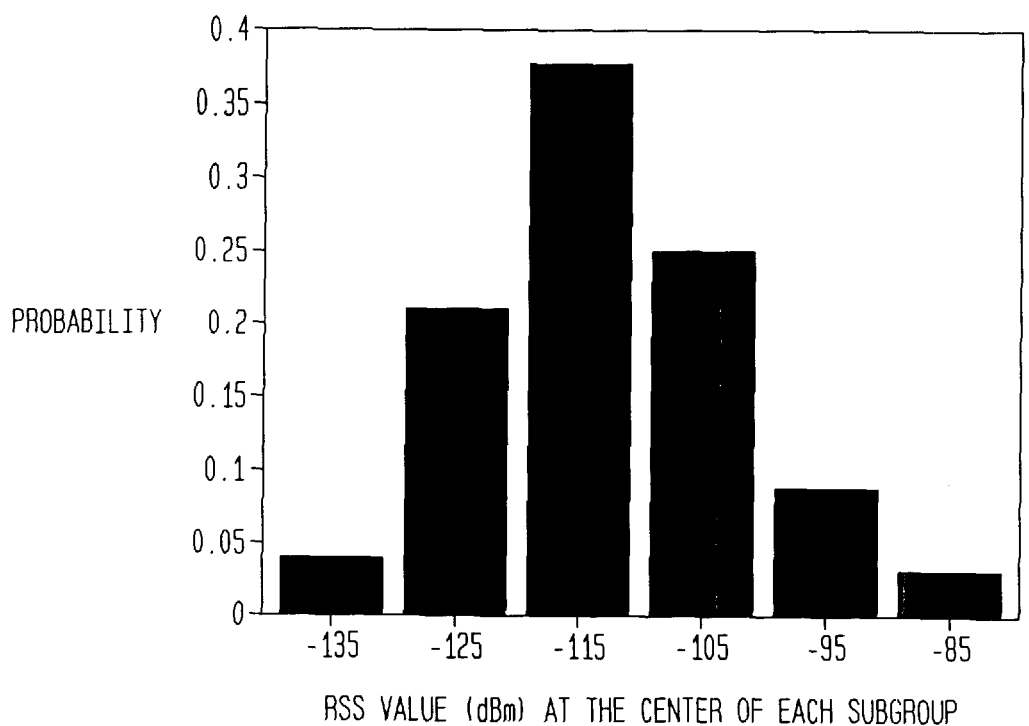
FIG. 3 is an exemplary graph illustrating a probability density function of mobile station accessing occurrences within specified power level intervals.

As expected, the channel group PDF values essentially sum to a value of one, each PDF value representing the probability that a mobile station accessing occurrence will fall within a power level interval associated with one of channel groups 1–6. The PDF values of Table 2 are plotted as a PDF of measured RSS in FIG. 3.

Once the probability density function is determined in step S14, the process continues with step S16. In step S16, the group allocator determines the number of channels to be allocated to each of the channel groups. The number of channels to be allocated to a particular channel group is the product of an available number of channels within a cell and the channel group's PDF value. Table 3 illustrates the number of channels allocated to each channel group assuming an exemplary value of twenty channels available to a cell (N=20):

TABLE 3

Number of Channels Allocated to Channel Groups

| Ch. Group | 1 | 2 | 3 | 4 | 5 | 6 |
|---|---|---|---|---|---|---|
| No. Ch. | 0.738 | 4.184 | 7.6 | 5.06 | 1.786 | 0.632 |

In step S18, the number of channels allocated to the channel groups may be subjected to a rounding and adjusting process so that each channel group includes an integral number of channels. Table 4 illustrates the number of channels allocated to each channel group after rounding:

TABLE 4

Number of Channels Allocated to Channel Groups — Rounded

| Ch. Group | 1 | 2 | 3 | 4 | 5 | 6 |
|---|---|---|---|---|---|---|
| No. Ch. | 1 | 4 | 8 | 5 | 2 | 1 |

After rounding, the total number of channels allocated to the channel groups equals 21. The channel allocation may then be adjusted by reducing by one the number of channels allocated to channel group 3, which has the most channels. Other adjusting processes are also suitable so long as the number of available channels is not exceeded. Table 5 illustrates the final allocation of channels to each channel group:

TABLE 5

Number of Channels Allocated to Channel Groups — Adjusted

| Ch. Group | 1 | 2 | 3 | 4 | 5 | 6 |
|---|---|---|---|---|---|---|
| No. Ch. | 1 | 4 | 7 | 5 | 2 | 1 |

In step S20, the group allocator allocates channels to channel groups in accordance with the values obtained in step S18. The allocation of channels is a logical allocation of channels among channel groups within the digital channel circuitry of the base station.

Assigning Mobile Stations to Allocated Channel Groups

After channels are allocated to channel groups in accordance with steps S10–S20, a channel assignment device assigns mobile stations to the allocated channel groups within each cell, which is illustrated as step S22 in FIG. 1. To facilitate assigning the mobile stations to appropriate channel groups, further RSS measurements may be necessary over time.

In particular, the method may further include dynamically measuring RSS of uplink transmit electromagnetic signals at frequencies used by the wireless system within the cell. As mobile stations access the base station and engage in communications, at least one RSS measurement device at an actively receiving base station takes real-time measurements of RSS associated with the actively transmitting mobile stations. Each of the uplink transmit electromagnetic signals and its corresponding mobile station is dynamically classified into one of the channel groups based upon its RSS and the channel group boundaries. Each mobile station is identifiable by a mobile station identifier.

Each mobile station is assigned to a channel group so that its RSS during a measurement period fits within the power intervals corresponding to the particular channel group. The channel assignments of the mobile stations based on a previous measurement period are periodically updated to account for movement of the mobile station throughout the cell. A measurement period is equal to at least a minimum time required for obtaining one reliable measurement of RSS. The RSS measurement device at the base station takes periodic measurements to compensate for fluctuations in the RSS of the mobile stations. Fluctuations in RSS may be caused by normal movement of the mobile stations throughout the cell.

Updating the Allocation of Channels to the Channel Groups

The channel groups may be reevaluated in response to changes in the dynamic range of RSS values. Alterations in the dynamic range of the RSS values may result from changes in user locations and/or traffic distribution in the wireless system. To update the allocation of channel groups based on the current dynamic range of the RSS, the base station may continuously collect RSS data. New RSS data added to the database is used to replace or supersede older RSS data.

The base station may update received signal strength data in the RSS database after either a fixed update period or after receipt of a fixed amount of new RSS data. Either occurrence can serve as the "update trigger" shown in FIG. 1. Although any update time interval consistent with the above principles may be used to measure the RSS data and to update the RSS database, a typical update time interval is expected to fall within a range of from about ten minutes to eight hours.

Updating older RSS data involves updating measured RSS data of individual mobile stations in order to prepare an updated PDF for a given cell. The measured RSS of each mobile station is updated on a user-by-user basis in order to replace a previous RSS value with a more recent RSS value. The group allocator then computes an updated PDF from the updated RSS data, and adjusts the number of channels allocated to each channel group accordingly.

Updating the Channel Groups

The number of and the sizes of the power level intervals associated with the channel groups may also be adjusted to provide a desired grade of service. This step is illustrated as step S24 in FIG. 1, and can be carried out by a group number decider within the group allocator. The desired number of channel groups and the size of the power level intervals may be tailored to the application of the channel grouping method. For example, the desired number of channel groups may depend upon a desired granularity of RF power control and capacity limitations in a TDMA communications system. As ranges of discrete power levels are made finer, a greater number of channel groups are required. However, the desired number of channel groups must be consistent with the capacity limits of the applicable communications equipment. The formation of channel groups is a logical assignment of digital channel circuitry within the base station, and the determination of the sizes and number of channel groups may be input manually by a cell site engineer.

In the channel grouping method described above, present users are reassigned to the most recent allocation of channel groups based on the updated channel groupings. As new mobile stations access the system, the new mobile stations are allocated to channel groups consistent with the most recent channel grouping and the mobile stations' RSS values.

When channels are allocated to channel groups according to the above method, the quality of service or accessing rate is essentially uniform for all mobile stations. By allocating a number of channels to each channel group that is proportional to the accessing probability of the channel group, channel groups with higher accessing probabilities are provided a greater capacity with which to service a greater number of accessing occurrences. This method maximizes the capacity of the wireless communication system, and reduces unsuccessful accessing attempts by mobile stations.

The channel grouping method may be applied to a TDMA system to facilitate RF power control. The TDMA system may include a plurality of bandwidths where each frequency bandwidth has time slots to accommodate a channel group of the grouping method. Accordingly, the number of the channel groups would be limited to the number of differing frequency bandwidths per cell.

The channel groups may be applied to a base station receiver to reduce RF isolation requirements between circuits in multiple-bandwidth receivers (e.g., wide-band receiver). For example, a multiple-bandwidth receiver may include multiple receive frequency bandwidths that are processed at a common intermediate frequency with common intermediate frequency modules. In this case, the number of channel groups is proportional to the number of common intermediate frequency modules present.

In the above-described method, the received signal strength of each channel refers to an uplink RSS of an electromagnetic transmission from a mobile station to a base station serving the cell. In an alternate embodiment, the received signal strength may refer to a downlink RSS of a transmission from a base station to a mobile station within the cell.

Application of the Channel Grouping Method to a Wireless System

Grouping channels into channel groups in conformance with the principles of the present invention reduces the RF isolation requirements of base station hardware and other wireless infrastructure. The channels may be grouped such that channels groups share common circuit modules (e.g., circuit boards) or common hardware, with the closest interaction between any two channel groups having similar values of signal strength.

Figure 4:
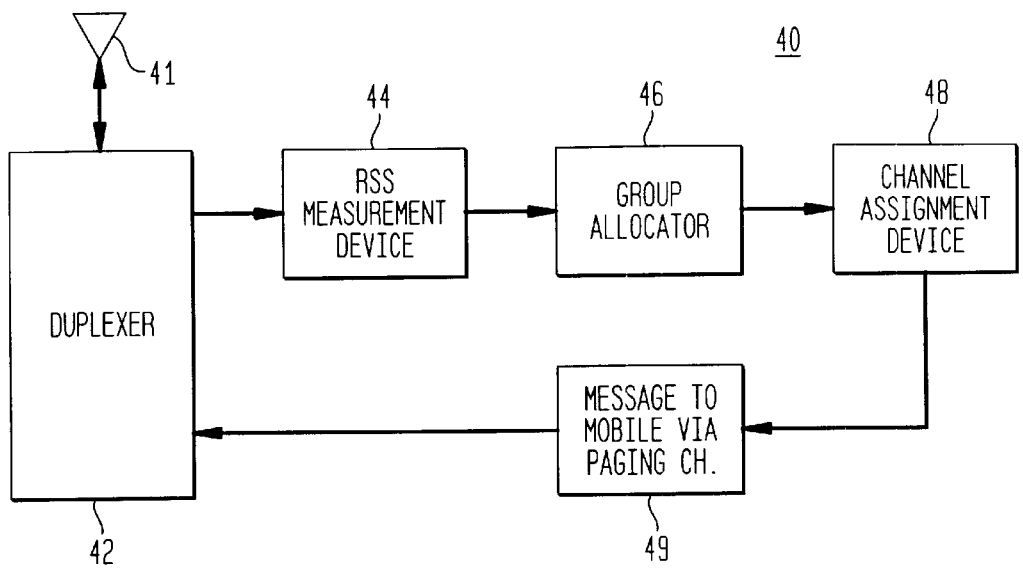
FIG. 4 is a schematic block diagram of a channel grouping system according to the present invention.

FIG. 4 illustrates a channel grouping system 40 that embodies the channel grouping method of the present invention. The channel grouping system 40 of FIG. 4 includes a transmitter/receiver 41, a duplexer 42, an RSS measurement device 44, a group allocator 46, and a channel assignment device 48. The transmitter/receiver 41 receives signals from mobile stations operating within the cell, and the duplexer 42 separates the signals transmitted to and from the transmitter/receiver 41, so that a single cable can be used to connect the transmitter/receiver 41 to the remainder of the channel grouping system 40. The RSS measurement device 44 determines the signal strengths of the signals received by the transmitter/receiver 41. These signal strength values are then forwarded to the group allocator 46.

In accordance with the method of the present invention, the group allocator 46 decides which channel groups will share common intermediate frequency circuit boards based upon input signals from the RSS measurement device 44, and upon channel boundaries defined in accordance with the channel grouping method of the invention. The group allocator 44 may comprise an RF switching matrix controlled by a processing system responsive to input signals from the RSS measurement device 44. The processing system may include a memory or a storage medium for storing a look-up table, etc.

The channel assignment device 48 assigns each mobile station accessing the wireless system to a channel group according to the RSS at which it accesses the wireless system. In accordance with step S22 of the method of the present invention, the channel assignment device 48 assigns a mobile station to a channel group so that its RSS during a measurement period fits within the power level interval corresponding to that particular channel group. The channel assignment device 48 generates a message 49 including the channel assignment order, which is transmitted to the mobile station through a paging channel.

Figure 5:
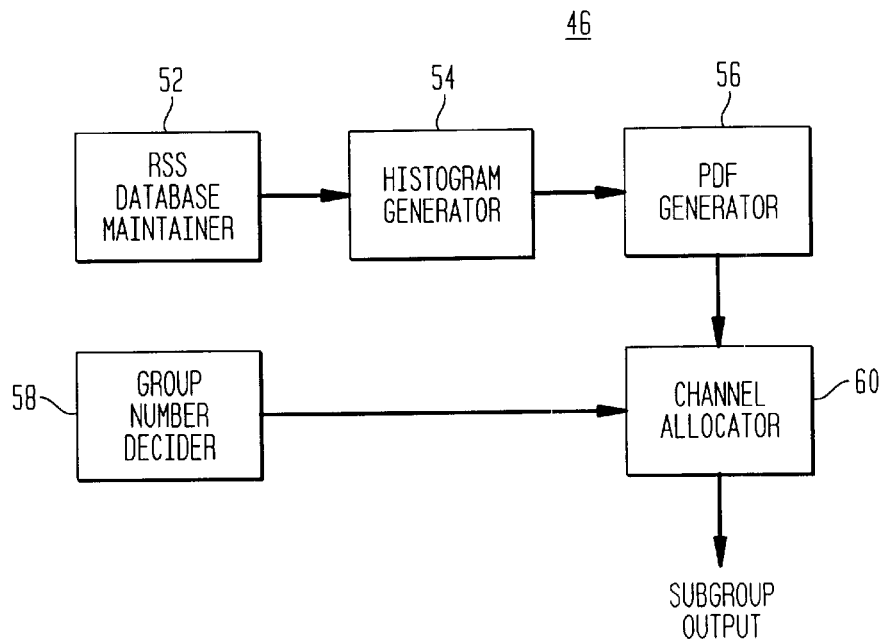
FIG. 5 is a schematic block diagram of the group allocator of FIG. 4.

FIG. 5 is a schematic diagram of the group allocator 46. The group allocator 46 is comprised of an RSS database maintainer 52, a histogram generator 54, a PDF generator 56, a group number decider 58, and a channel allocator 60. The RSS database maintainer 52 provides RSS values from a specified sampling period to the histogram generator 54. The histogram generator 54 arranges the RSS data into an RSS histogram of mobile station accessing occurrences versus the received signal strengths of the accessing occurrences, in accordance with step S10 of the present invention.

The histogram generated by the histogram generator 54 is transformed by the PDF generator 56 into a probability density function of the RSS data, in accordance with step S14 of the present invention. The PDF expresses the probability that a mobile station will present a particular RSS value to the RSS measurement device 44. The PDF of RSS data is then forwarded to the channel allocator 60.

Depending upon a number of channel groups generated by the group number decider 58, the channel allocator 60 allocates an available number of channels among the channel groups. The channel allocator 60 allocates channels in accordance with step S16 of the present invention. The number of channels in each group can be rounded and adjusted so that the available number of channels is utilized.

The group number decider 58 may determine a desired number of channel groups (or, power level intervals) specific to the application of the channel grouping method. The group number decider also determines the size of the power level interval associated with the channel groups, in accordance with step S24. The group number decider 58 can account for such factors as a desired granularity of RF power control, capacity limitations in the TDMA communications system, etc.

This specification describes various illustrative embodiments of the system and method of the present invention. The scope of the claims is intended to cover various modifications and equivalent arrangements of the illustrative embodiments disclosed in the specification. Therefore, the following claims should be accorded the reasonable broadest interpretation to cover the modifications, equivalent structures, and features which are consistent with the spirit and scope of the invention disclosed herein.

What is claimed is:

1. A method for defining channel groups in a wireless system, the method comprising:

associating signal strengths of signals received from mobile terminals with a plurality of power level intervals, the plurality of power level intervals corresponding to a plurality of channel groups; and allocating a number of channels to each channel group based on the association of the signal strengths with the plurality of power level intervals, wherein associating the signal strengths with the power level intervals includes dividing the number of signal strengths in each power level interval by a total number of signal strengths, a quotient value thereby being associated with each channel group.

2. The method of claim 1, wherein associating the signal strengths with the power level intervals includes generating a histogram of the signal strengths.

3. The method of claim 2, wherein associating the signal strengths with the power level intervals includes generating a probability density function from the histogram.

4. The method of claim 1, wherein associating the signal strengths with the power level intervals includes determining the number of signal strengths that fall within each power level interval.

5. The method of claim 4, wherein associating the signal strengths with the power level intervals includes:

multiplying the quotient value associated with each channel group by a predetermined number of channels, a product value thereby being associated with each channel group; and rounding the product value associated with each channel group to an integer number.

6. The method of claim 5, wherein allocating the number of channels to each channel group includes allocating the number of channels to each channel group based on its associated rounded product value.

7. The method of claim 4, wherein the power level intervals are a series of substantially equal power level intervals.

8. The method of claim 4, wherein allocating the number of channels to each channel group includes allocating the number of channels to a channel group that is proportional to the number of signal strengths that fall within its corresponding power level interval.

9. The method of claim 1, wherein the received signals are received at a base station.

10. The method of claim 1, wherein the associating step produces a number of signal strengths of received signals associated with each channel group; and the allocating step allocates a number of channels to each channel group based on the number of signal strengths of received signals associated with each channel group.

11. The method of claim 10, wherein the allocating step allocates the number of channels to each channel group based on the number of signal strengths of received signals associated with each channel group and a total number of signal strengths of received signals.

12. The method of claim 11, wherein the allocating step additionally allocates the number of channels to each channel group based on the total number of channels to allocate.

13. A channel grouping system for use in a wireless system, the channel grouping system comprising:

a received signal strength determining device for determining signal strengths of signals received from mobile terminals; and a group allocator, the group allocator associating the signal strengths with a plurality of power level intervals, the plurality of power level intervals corresponding to a plurality of channel groups, the group allocator further allocating a number of channels to each channel group based on the association of the signal strengths with the plurality of power level intervals, the group allocator further allocates the number of channels to each channel group based on the number of signal strengths of received signals associated with each channel group and a total number of signal strengths of received signals.

14. The channel grouping system of claim 13, wherein the group allocator includes a histogram generator for generating a histogram of the signal strengths.

15. The channel grouping system of claim 14, wherein the group allocator includes a probability density function generator for generating a probability density function from the histogram.

16. The channel grouping system of claim 15, wherein the group allocator includes a channel allocator for allocating a number of channels to each channel group based on the probability density function.

17. The channel grouping system of claim 15, wherein the group allocator includes a group number decider for deciding a number of channel groups to be employed by the channel grouping system.

18. The channel grouping system of claim 13, further comprising a channel assignment device for assigning mobile stations accessing the wireless system to said channel groups.

19. The system of claim 13, wherein the group allocator tracks a number of signal strengths of the received signals associated with each channel group and allocates the number of channels to each channel group based on the number of signal strengths of received signals associated with each channel group.

20. The method of claim 19, wherein the group allocator further allocates the number of channels to each channel group based on the total number of channels to allocate.

21. A method for defining channel groups in a wireless system, the method comprising:

receiving a plurality of signals from a plurality of mobile terminals;

classifying each received signal as falling within one of a series of power ranges, each power range being associated with one of a plurality of channel groups; and allocating channels to each channel group, based on the number of received signals classified as falling within the power range associated with the channel group;

wherein the series of power ranges includes a plurality of interior power ranges, and two exterior power ranges, one exterior power range being located at a high end of the series of power ranges and the other power range being located at a low end of the series of power ranges, the interior power ranges being of equal size.

22. The method of claim 21, wherein the channels are allocated nonuniformly among the channel groups.

* * * * *